United States Patent [19]

Kanamaru

[11] 4,273,998
[45] Jun. 16, 1981

[54] SERVO UNIT FOR OPTICAL TYPE INFORMATION READING DEVICE

[75] Inventor: Hitoshi Kanamaru, Tokorozawa, Japan

[73] Assignee: Universal Pioneer Corporation, Tokyo, Japan

[21] Appl. No.: 49,862

[22] Filed: Jun. 18, 1979

[30] Foreign Application Priority Data

Jun. 19, 1978 [JP] Japan .................................. 53-73976

[51] Int. Cl.$^3$ ............................................... G01J 1/36
[52] U.S. Cl. ....................................... 250/204; 369/45; 369/46
[58] Field of Search ............... 250/201, 204, 216, 578; 179/100.3 V, 100.3 G, 100.1 G

[56] References Cited

U.S. PATENT DOCUMENTS

| | | | |
|---|---|---|---|
| 4,023,033 | 5/1977 | Bricot et al. | 250/204 |
| 4,025,949 | 5/1977 | Whitman | 250/201 |
| 4,059,841 | 11/1977 | Bricot et al. | 179/100.3 V |
| 4,128,847 | 12/1978 | Roullet et al. | 250/201 |
| 4,143,402 | 3/1979 | Bricot et al. | 179/100.1 G |

*Primary Examiner*—David C. Nelms
*Attorney, Agent, or Firm*—Sughrue, Rothwell, Mion, Zinn and Macpeak

[57] ABSTRACT

A servo unit in an optical information reading device having a lens for focussing an irradiation light beam on the record surface of a disk. A movable mirror positions the focal point of the irradiation light beam formed on the track of the disk. A cylindrical lens is arranged so that the central axis of the cylinder forms a 45° angle with the track direction of the disk to allow a light beam from the record surface to pass through the cylindrical lens. A focussing light receiver having four separate light receiving units is arranged on two orthogonal straight lines. The focussing light receiver receives a focus controlling light beam passed through the cylindrical lens at a distance twice as long as the focal distance of the cylindrical lens. A pair of tracking light receiving elements are provided on both sides of the focussing light receiver such that the light receiving surfaces are flush with the light receiving surface of the focussing light receiver and arranged linearly to receive a pair of tracking controlling light beams. The focal point of the irradiation light beam formed by said focussing lens is positioned on the record surface in response to an output of the focussing light receiver. The movable mirror is adjusted so that the focal point is positioned on the track in response to outputs of the pair of tracking light receiving elements and the focussing light receiver is arranged so that one of the two straight lines coincides with the central line of the cylinder of the cylindrical lens.

6 Claims, 11 Drawing Figures

FIG. 3
PRIOR ART
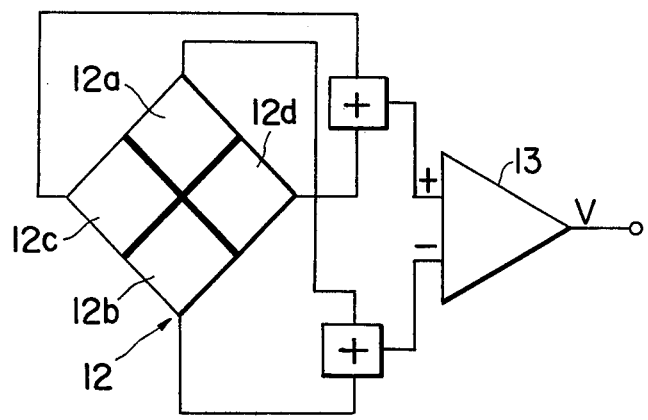
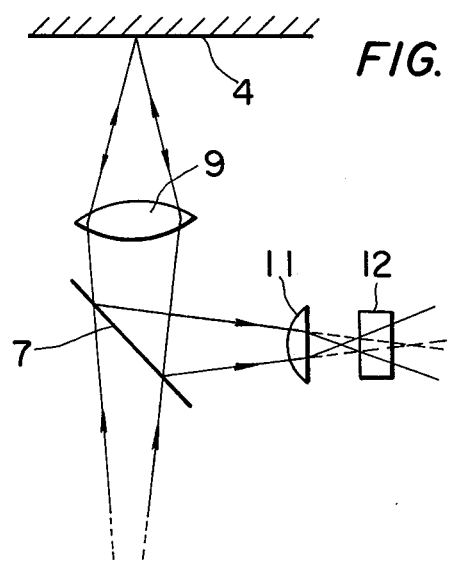
FIG. 4(a)
FIG. 4(b)
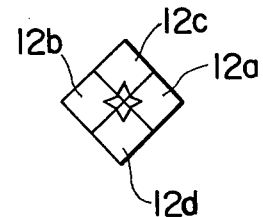

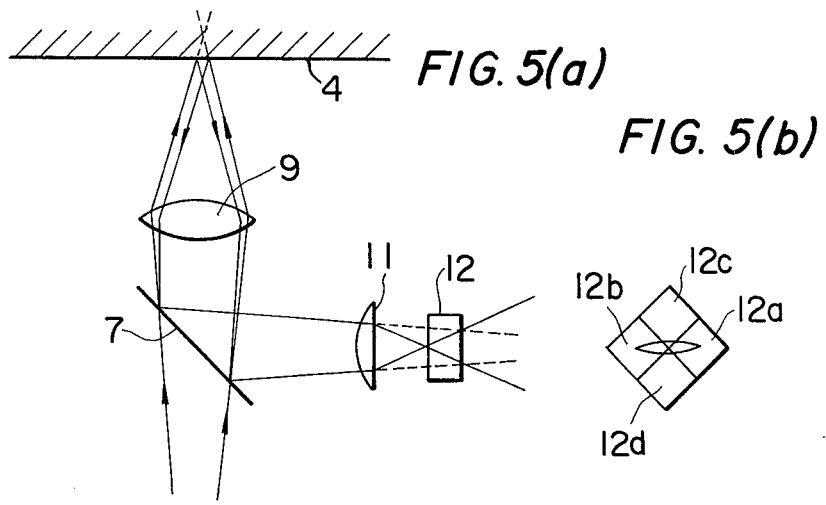
FIG. 5(a)
FIG. 5(b)
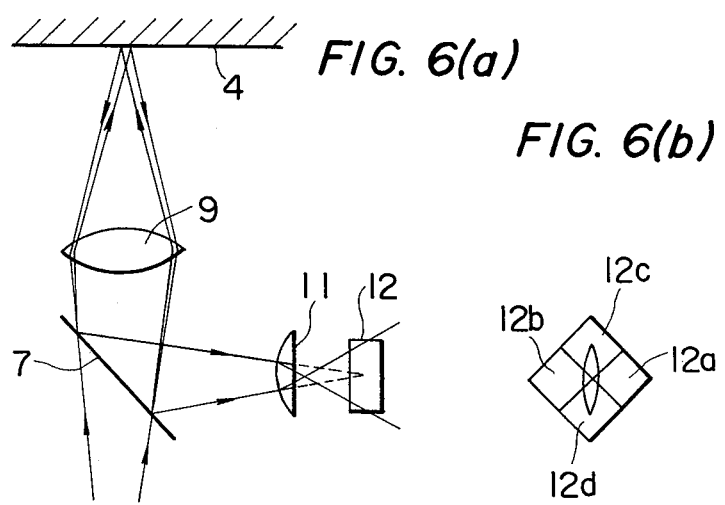
FIG. 6(a)
FIG. 6(b)

SERVO UNIT FOR OPTICAL TYPE INFORMATION READING DEVICE

BACKGROUND OF THE INVENTION

This invention relates to servo units in optical type information reading devices. More specifically, it relates to a three-beam system focus and tracking servo unit in an optical type video disk information reading device.

FIG. 1(a) is a plan view of a component of an optical type video disk, and FIG. 1(b) is a sectional view of the component. In the optical type video disk, as shown in FIG. 1, pits 2 (recesses) are provided in one surface of a disk substrate made of transparent material in such a manner that they form coaxial or spiral tracks. Data are recorded by the lengths and intervals of these pits 2. The surface including the pits 2 is covered with a reflection film obtained by vacuum-evaporating aluminum in order to increase the optical reflection factor. A protective film 3 is placed on the reflection film.

Reading data out of the disk 1 is carried out as follows: Light is applied to the surface of the disk 1 where no pit 2 is provided and the reflection light from the data record surface 4 which has been modulated by the presence or absence of the pits 2 is demodulated. In such an information record disk reading device, a so-called "focus and tracking servo unit" is provided in order to accurately focus the incident light on the disk data record surface and to position the focussed incident light on the track of the disk at all times.

FIG. 2 is a schematic diagram showing a conventional three-beam system focus and tracking servo unit. Beams emitted from a light source 5 such as a helium neon laser are passed through a collimator lens 6, a beam splitter 7 and a movable mirror 8. They are then focussed in the vicinity of the data record surface 4 of the disk 1 by means of a focussing lens 9. The disk 1 is rotated at high speed by an electric motor 10. The reflection light from the record surface 4 of the disk is passed through the focussing lens 9 and the movable mirror 8 to the beam splitter 7, where it is split and thereafter the resultant beam is converted into an electrical signal by a photo-electric conversion element.

In such systems, it is difficult to make the disk 1 completely flat. Usually, the disk 1 is inclined when placed over the rotary shaft of the motor 10. Accordingly, the record surface 4 is moved up and down as the disk 1 is rotated. In order to correctly read the data out of the disk, the movable mirror 8 and the focussing lens 9 must follow the vertical movement of the record surface and the track of the pits 2 to focus the beams on the record surface 4 and on the track at all times. In order to satisfy this requirement, a cylindrical lens 11 is provided ahead of the focal point of the reflection beam from the disk 1, which is formed by means of the focussing lens 9. After the lens 11 a focussing light receiving element 12 and a pair of tracking light receiving elements 17a and 17bare provided. The light receiving elements 17a and 17bare disposed on both sides of the light receiving element 12. These elements 12, 17aand 17b are positioned linearly in the track direction. The focussing light receiving element 12 is made up of four independent light receiving units 12a, 12b, 12c and 12d as shown in FIG. 3. These light receiving units 12a through 12d are arranged so that lines separating the units from one another form 45° with the central axis of the cylinder of the cylindrical axis. This technique is disclosed in co-pending U.S. patent application Ser. No. 48,421, entitled "Automatic Focus Servomechanism in Optical Information Reading Device", filed on June 14, 1979 and commonly assigned. A position on the optical axis, at which the light beams passing through the lens 11 are focussed, on the plane including the generating lines of the cylindrical lens is different from that on the plane perpendicular to the aforementioned plane. By utilizing this principle, the configuration of light beams applied to the light receiving surfaces of the four light receiving units 12a through 12d are detected and measured to determine the relation between the record surface 4 and the focal point of the focussing lens 9.

More specifically, the light receiving surfaces of the light receiving units are arranged at the position where, when the focal point of the incident light through the focussing lens 9 is correctly positioned on the record surface of the disk 1. This is shown in FIG. 4(a) where the reflection light passing through the cylindrical lens 11 forms substantially a square (FIG. 4(b)). Under this condition, the outputs Va, Vb, Vc and Vd of the light receiving units are equal to one another, and the following equation is established:

$$Va + Vb = Vc + Vd$$

Accordingly, the output V of a differential amplifier 13 (FIG. 3) receiving differential inputs (Va+Vb) and (Vc+Vd) is zero. Therefore, since the output of an amplifier 14 is zero, and the output of a lens drive device 15 is also zero (FIG. 2), and the position of the focussing lens 9 is maintained unchanged.

When the incident light is focussed behind the record surface 4 as shown in FIG. 5(a), i.e., when the distance between the record surface 4 and the focussing lens is shorter, the configuration of the incident light on the light receiving surface of the light receiving element 12 is shown in FIG. 5(b). Therefore, (Va+Vb)>(Vc+Vd), and V<0 (V being the output of the differential amplifier 13).

When the incident light is focussed ahead the record surface as shown in FIG. 6(a), then the configuration of the light on the light receiving surface is as shown in FIG. 6(b). Therefore (Va+Vb)<(Vc+Vd), and V>0.

Thus, the output of the differential amplifier 13 corresponding to the configuration of the light beam on the light receiving surface of the light receiving element is employed as an error signal, which is amplified by the amplifier 14 and is then converted into displacement data by the drive device 15. As a consequence the position of the focussing lens 9 is controlled by a holder 16; that is, automatic focus control is carried out. Furthermore, a tracking drive 20 receives the outputs of the pair of tracking light receiving elements which are provided on both sides of the focussing light receiving element 12 linearly in the track direction of the disk 1 to position the movable mirror 8. Hence, tracking control is carried out to correctly apply the focussed beam to the track of the pits 2.

In the focus and tracking servo unit as described above, when the focussed beam is correctly applied to the track of the pits 2, i.e., when tracking is correctly obtained, the track of the pits 2 is projected as a dark stripe onto a straight line connecting the centers of the light receiving surfaces of the light receiving units 12a and 12b, or 12c and 12d. Accordingly, as long as the proper focalization of the focussing lens is obtained, the output of the differential amplifier 13 receiving the differential inputs (Va+Vb) and (Vc+Vd) is zero. However, if the tracking is incorrect, then the inputs (Va+Vb) and (Vc+Vd) deviate from each other. As a result, an error signal is produced by the light receiving element 12 to reversely affect the focus servo operation.

In order to overcome this difficulty, a method has been provided in which the cylindrical lens 11 is arranged in such a manner that the central axis of the cylinder forms 45° with respect to the track direction of the disk 1. However, this method is still disadvantageous for the following reason. Since one pair of tracking light receiving elements 17a and 17b are provided on both sides of the focussing light receiving element 12 linearly in the track direction of the disk 1, and the central axis of the cylindrical lens forms 45° with the track direction of the disk 1. A pair of tracking controlling light beams passing through the cylindrical lens 11 cannot reach the light receiving surfaces of the paired light receiving elements 17a and 17b. That is, a so-called three-beam system tracking control cannot be carried out.

SUMMARY OF THE INVENTION

Accordingly, an object of the invention is to provide a focus and tracking servo unit for an optical type information reading device, in which all of the above-described difficulties have been eliminated.

It is another object of this invention to provide a focus and tracking servo unit that provides accurate tracking control for a three beam system.

Yet another object of this invention is to provide a focus and tracking servo unit for an optical type information reading device that is accurate, reliable and easy to use.

These and other objects of this invention are accomplished in a servo unit in an optical type information reading device having a focussing lens for focussing an irradiation light beam on the record surface of a disk. A movable mirror positions the focal point of the irradiation light beam formed on the track of the disk. A cylindrical lens is arranged so that the central axis of the cylinder thereof forms a 45° angle with the track direction of the disk to allow a light beam from the record surface to pass through the cylindrical lens. A focussing light receiver having four separate light receiving units are arranged on two orthogonal straight lines. The focussing light receiver receives a focus controlling light beam passed through the cylindrical lens at a distance twice as long as the focal distance of the cylindrical lens.

A pair of tracking light receiving elements are provided on both sides of the focussing light receiver in such a manner that the light receiving surfaces thereof are flush with the light receiving surface of the focussing light receiver and arranged linearly to receive a pair of tracking controlling light beams. The focal point of the irradiation light beam formed by said focussing lens is positioned on the record surface in response to an output of the focussing light receiver. The movable mirror is adjusted so that the focal point is positioned on the track in response to outputs of the pair of tracking light receiving element and the focussing light receiver is arranged so that one of the two straight lines coincides with the central line of the cylinder of the cylindrical lens.

This invention will now be described with reference to the drawings and the description of the preferred embodiment that follows.

BRIEF DESCRIPTION OF THE DRAWINGS

FIG. 3 is a diagram indicating the relation between a light receiving element and a differential amplifier in FIG. 2;

FIG. 4(a) is an explanatory diagram showing the relation between a cylindrical lens and the light receiving element obtained when an incident light is correctly focussed on a record surface with the unit shown in FIG. 2;

FIG. 4(b) is also an explanatory diagram showing a configuration of a light beam formed on the light receiving surface of the light receiving element in the same case;

FIG. 5(a) shows the relation between the cylindrical lens and the light receiving element when the record surface is closer to a focussing lens with the unit shown in FIG. 2;

FIG. 5(b) shows a configuration of the light beam formed on the light receiving surface in the same case;

FIG. 6(a) shows the relation between the cylindrical lens and the light receiving element obtained when the record surface is moved apart from the focussing lens;

FIG. 6(b) shows a configuration of the light beam formed on the light receiving surface in the same case.

DESCRIPTION OF THE PREFERRED EMBODIMENT

Figure 1A:
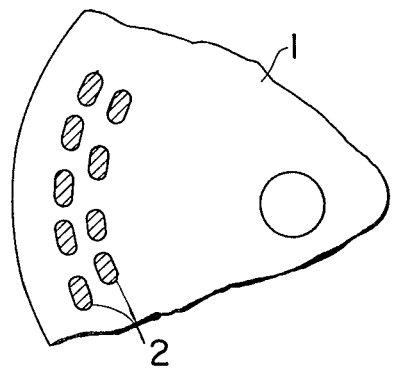
FIGS. 1(a) and (b) are a plan view and a sectional view of a part of a video disk.
Figure 1B:
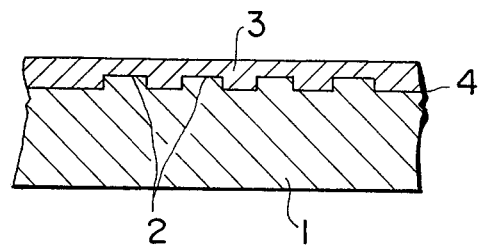
Figure 2:
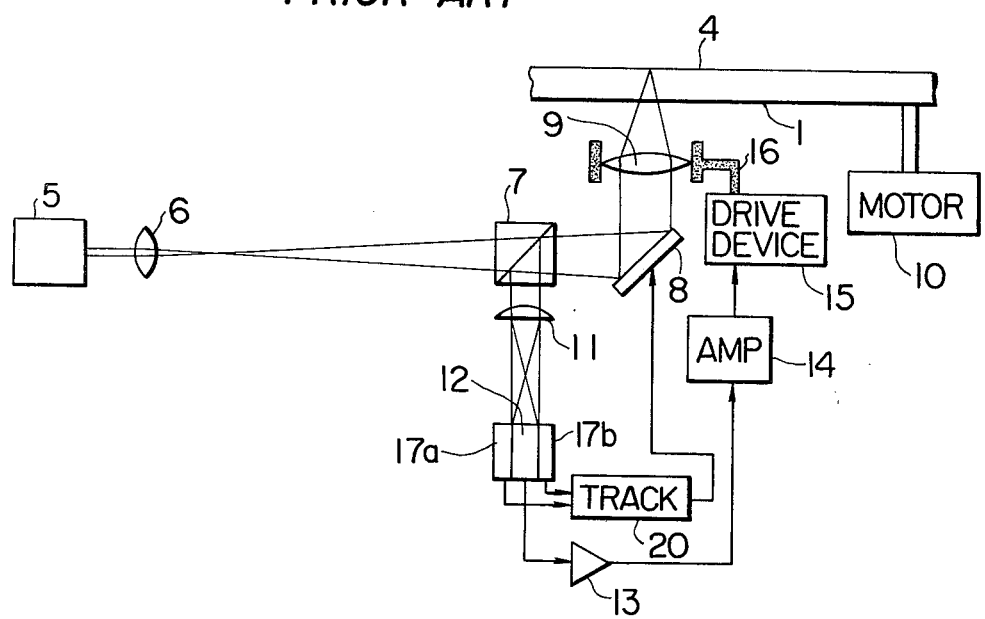
FIG. 2 is a schematic diagram of the arrangement of a conventional focus and tracking servo unit.
Figure 7:
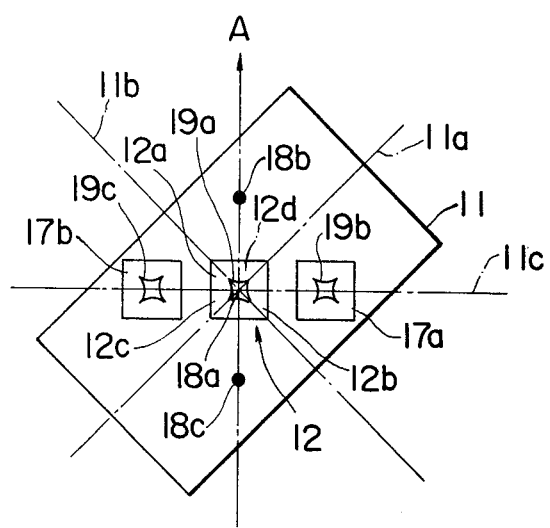
FIG. 7 is an explanatory diagram showing the positional relation between the cylindrical lens and the focussing light receiving element in a focus and tracking servo unit according to this invention.

Now, the present invention will be described in detail. The focus and tracking servo unit in the optical type information reading device according to the invention is fundamentally similar to the conventional one shown in FIG. 2. However, as shown in FIG. 7, the central axis 11a of the cylinder of the cylindrical lens 11 forms a 45° angle with the track direction (indicated by the arrow A) of the pits 2, i.e., the direction of rotation of the disk 1. Furthermore, the focussing light receiving element 12 is arranged so that the straight line 11b connecting the centers of the light receiving surfaces of its light receiving units 12a and 12b, or 11a connecting the centers of 12c and 12d, forms a 45° angle with the track direction (indicated by the arrow A), i.e., the straight line connecting the centers of the light receiving surfaces of the light receiving units 12c and 12d coincides with the central axis 11a of the cylindrical lens 11.

The paired tracking light receiving elements 17a and 17b are arranged on a line 11c forming a 45° angle with the central axis 11a. Accordingly, the tracking light receiving elements 17a and 17b form 90° with the track direction A of the disk.

With the servo unit thus arranged, when the focalization is correct, the light beam from the record surface 4 is formed as three light beams 18a, 18b and 18c on the cylindrical surface of the cylindrical lens 11, which are arranged in the track direction. This is indicated by three black dots in FIG. 7.

If the focal distance of the cylindrical lens 11 is represented by f, then the optimum distance D between the principal point of the cylindrical lens 11 and the light receiving surface of the light receiving element is, in general, equal to 2f (D=2f). Accordingly, the three light beams 18a, 18b and 18c on the cylindrical surface are positioned as light beams 19a, 19b and 19c on a line 11c forming a 90° angle with the track direction on the light receiving surface. This is spaced by a distance D=2f from the cylindrical lens 11, respectively. That is, the focussing light beam 18a is projected as the light beam 19a onto the light receiving surface of the focussing light receiving element 12, while the tracking light beams 18b and 18c are projected as the light beams 19b and 19c onto the light receiving surfaces of the tracking light receiving elements 17a and 17b, respectively.

As is clear from the above description, the focus control and the tracking control according to the three-beam system can be positively carried out by providing the cylindrical lens 11 in such a manner that its central axis 11a forms a 45° angle with the direction of rotation of the disk 1, by allowing the straight line connecting the centers of the light receiving surfaces of the light receiving units 12a and 12b, or 12c and 12d, of the focussing light receiving element 12 to coincide with the central axis 11, and by arranging the pair of tracking light receiving elements 17a and 17b on the line which forms a 45° angle with the central axis 11a.

What is claimed is:

1. In a servo unit in an optical type information reading device having a focussing lens for focussing an irradiation light beam on the record surface of a disk; a movable mirror for positioning the focal point of said irradiation light beam formed by said focussing lens, on the track of said disk; the improvement comprising:

a cylindrical lens arranged with the central axis of the cylinder forming a 45° angle with the track direction of said disk, thereby allowing a light beam from said record surface to pass through cylindrical lens, focussing light receiving means having receiving units with light receiving surfaces, said light receiving surfaces having centers arranged on two orthogonal lines, said focussing light receiving means receiving a focus controlling light beam passing through said cylindrical lens at a distance at least twice as long as the focal distance of said cylindrical lens;

tracking light receiving elements having light receiving surfaces provided on both sides of said focussing light receiving means such that the light receiving surfaces receive a pair of tracking controlling light beams;

adjusting means for positioning the focal point of said irradiation light beam formed by said focussing lens on said record surface of said disk in response to an output of said focussing light receiving means; and means for adjusting the position of said movable mirror so that said focal point is positioned on the track of said disk in response to outputs of said pair of tracking light receiving elements, said focussing light receiving means arranged so that one of said two orthogonal lines coincides with the cylindrical axis of the cylinder of said cylindrical lens, and said tracking light receiving elements arranged on a tracking line which forms a 45° angle with said cylindrical axis.

2. A servo unit as in claim 1, wherein said focussing light receiving means comprises four separate light receiving units arranged in pairs, the centers of the light receiving surfaces of a pair or receiving units being disposed on one orthogonal line and the centers of the light receiving surfaces of the other pair being disposed on the other orthogonal line.

3. A servo unit as in claims 1 or 2, wherein said two orthogonal lines each form a 45° angle with said tracking line of said tracking light receiving elements.

4. A servo unit as in claims 1 or 2, wherein said tracking light receiving elements comprise a pair of elements linearly arranged on said tracking line.

5. A servo unit as in claim 4, wherein the light receiving surfaces of said tracking light receiving elements are flush with the light receiving surfaces of said light receiving means.

6. A servo unit of claim 4, wherein said tracking line is perpendicular to said track direction of said disk.

* * * * *